(12) United States Patent
Morrison et al.

(10) Patent No.: US 7,325,463 B2
(45) Date of Patent: Feb. 5, 2008

(54) FLUID SENSOR ASSEMBLY

(75) Inventors: Andrea L. Morrison, Rocky River, OH (US); Tim Beckwith, Vermilion, OH (US); Mark Sciulli, Lorain, OH (US); John Bias, Cleveland, OH (US); Duane Johnson, Wellington, OH (US); Jeffrey Krause, Wellington, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 200 days.

(21) Appl. No.: 11/228,822

(22) Filed: Sep. 16, 2005

(65) Prior Publication Data

US 2007/0062306 A1 Mar. 22, 2007

(51) Int. Cl.
*G01F 1/37* (2006.01)

(52) U.S. Cl. .................................. 73/861.52

(58) Field of Classification Search ............ 73/724, 73/756, 730, 718, 731, 706, 861.52
See application file for complete search history.

(56) References Cited

U.S. PATENT DOCUMENTS

| | | | |
|---|---|---|---|
| 3,653,689 A | 4/1972 | Sapy et al. | |
| 3,999,783 A | 12/1976 | Legris | |
| 4,005,883 A | 2/1977 | Guest | |
| 4,103,124 A | 7/1978 | Reis | |
| 4,220,359 A | 9/1980 | Evenson et al. | |
| 4,454,765 A * | 6/1984 | Lodge .......................... | 73/724 |
| 4,716,492 A | 12/1987 | Charboneau et al. | |
| 4,774,626 A | 9/1988 | Charboneau et al. | |
| 4,928,530 A | 5/1990 | Lehto et al. | |
| RE33,518 E | 1/1991 | McCord et al. | |
| 5,320,495 A | 6/1994 | Ralph | |
| 5,436,795 A | 7/1995 | Bishop et al. | |
| 5,683,120 A | 11/1997 | Brock et al. | |
| 5,922,965 A * | 7/1999 | Behm et al. .................. | 73/706 |
| 6,131,468 A | 10/2000 | Sich et al. | |
| 6,334,634 B1 | 1/2002 | Osterkil | |
| 2005/0092586 A1 | 5/2005 | Lee | |

OTHER PUBLICATIONS

AquaMetrix Inc. brochure, "Flow Sensor", 4 pgs.

* cited by examiner

*Primary Examiner*—Jewel Thompson
(74) *Attorney, Agent, or Firm*—Calfee Halter & Griswold LLP

(57) ABSTRACT

A fluid sensor assembly is provided for sensing a fluid property in-line. The assembly includes a body with a port for connecting the body to a fluid line and internal passage connecting the first port to a second port. The assembly also includes a sensor interface portion attached to the body and a fluid sensor that interfaces with the sensor interface portion. The fluid sensor includes a sensing element that communicates with the internal passage via the second port. The sensor and the body are fixably attached by an attaching portion to form a single, integrated part.

30 Claims, 5 Drawing Sheets

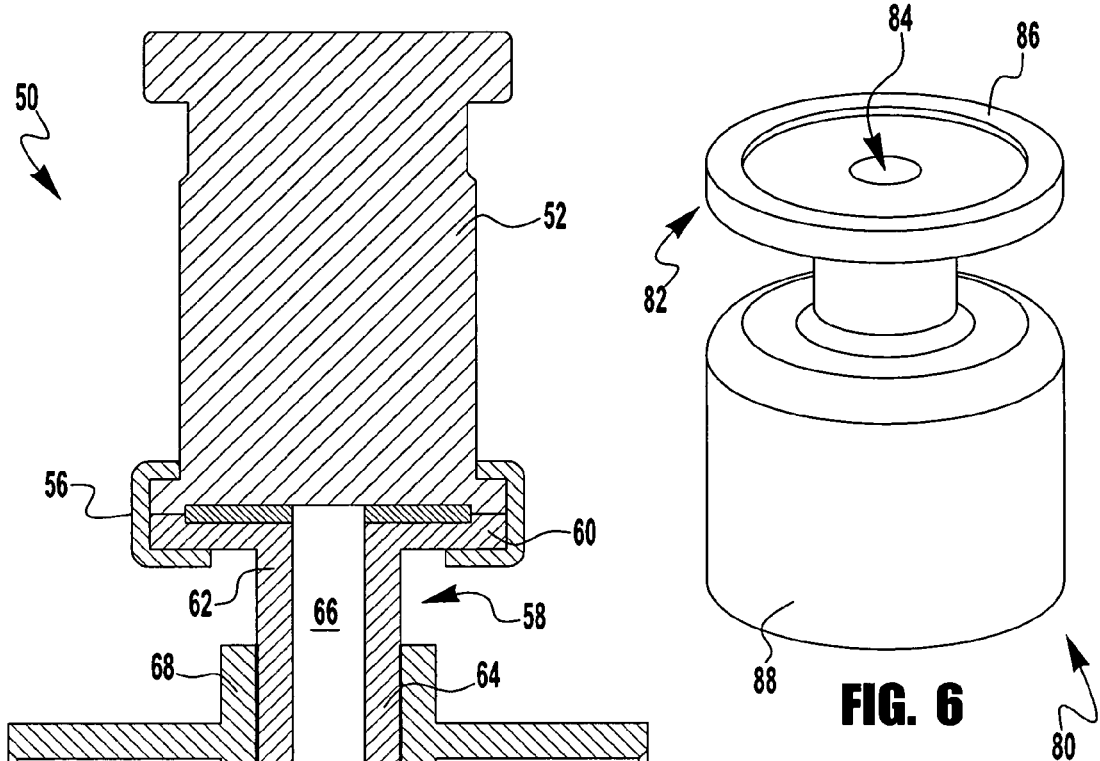
FIG. 5
FIG. 6
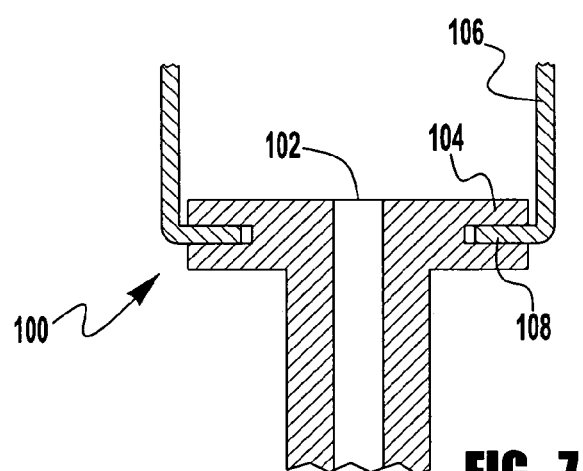
FIG. 7

FLUID SENSOR ASSEMBLY

BACKGROUND OF INVENTION

The present invention relates to a sensor assembly for sensing a property or characteristic of a fluid. It finds particular application in conjunction with sensing a fluid property in-line, wherein the assembly includes a fluid sensor fixably attached to a body to form a single, integrated part. It will be appreciated, however, that the invention is also amendable to other applications.

In many fluid systems, properties or characteristics of the fluid are monitored in-line. For example, in vehicle air braking systems, in-line air pressure is monitored via a signal produced by a pressure sensor such as a pressure switch or pressure transducer. A known approach to measuring in-line air pressure is to provide a connector, such as a tee fitting, to which one or more air lines and a pressure sensor may attach. The connector is configured to allow air to flow into or through it while positioning the pressure sensor in fluid communication with the air, thus enabling the sensor to sense the air pressure.

In order to attach the pressure sensor to the connector, two additional parts are used. First, a push-to-connect fitting is inserted into a port on the connector to provide a connection point for the pressure sensor. Second, an end adapter is attached to the pressure sensor to allow the sensor to be inserted into the push-to-connect fitting. Thus, the known approach to measuring air pressure in an air line typically includes a connector, a push-to-connect fitting, an adapter, and a pressure sensor. The additional parts in this known approach, however, add cost and complexity to the system and provide additional points in which leaks may occur.

SUMMARY OF INVENTION

A fluid sensor assembly is provided for sensing a fluid property in-line. The assembly includes a body with a port for connecting the body to a fluid line and internal passage connecting the first port to a second port. The assembly also includes a sensor interface portion attached to the body and a fluid sensor that interfaces with the sensor interface portion. The fluid sensor includes a sensing element that communicates with the internal passage via the second port. The sensor and the body are fixably attached by an attaching portion to form a single integrated part.

BRIEF DESCRIPTION OF DRAWINGS

In the accompanying drawings which are incorporated in and constitute a part of the specification, embodiments of the invention are illustrated, which together with a general description of the invention given above, and the detailed description given below, serve to exemplify the embodiments of this invention, wherein:

FIG. 5 illustrates a side cross-section of the exemplary sensor assembly of FIG. 4;

FIG. 6 illustrates a perspective view of a body of a third embodiment of the exemplary sensor assembly according to the present invention;

FIG. 7 illustrates a side cross-section of a body of a fourth embodiment of the exemplary sensor assembly connector according to the present invention, enlarged at the junction between the body and a sensor.

DETAILED DESCRIPTION OF DRAWINGS

The present invention relates to a sensor assembly for sensing a property or characteristic of a fluid. In particular, the present invention relates to a sensor assembly for sensing a fluid property in-line, wherein the assembly includes a fluid sensor fixably attached to a body to form a single, integrated part. Thus, the invention combines two or more parts into a single piece for easy attachment of a fluid sensor to a fluid line. Further, the invention provides minimal leak points per assembly and is a more cost effective solution than prior known designs.

Figure 1:
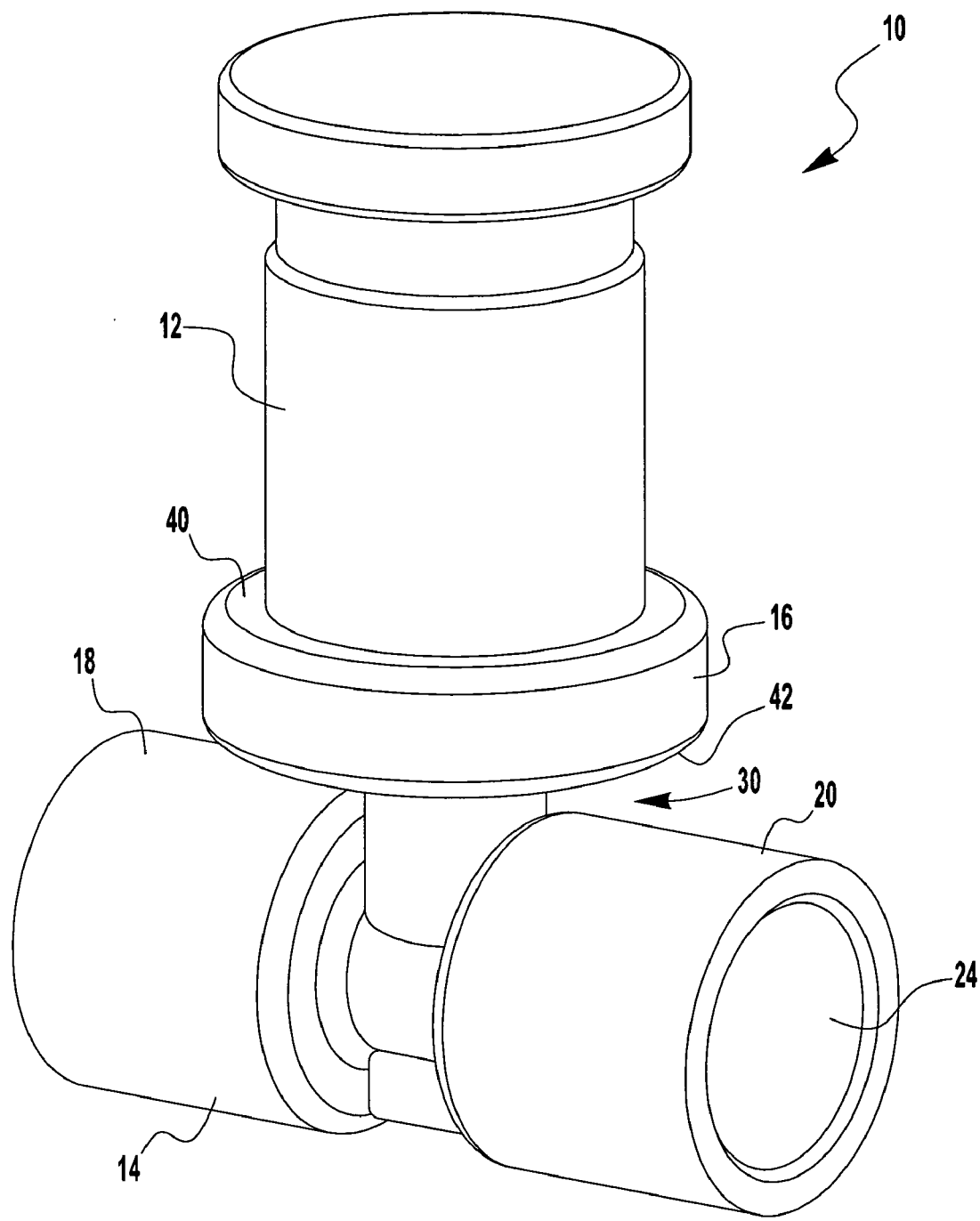
FIG. 1 illustrates a perspective view of a first exemplary sensor assembly according to the present invention.

FIG. 1 illustrates a first exemplary sensor assembly 10 according to the present invention. The sensor assembly 10 includes a fluid sensor 12 mounted to a body 14 via an attaching portion 16, such as for example an attaching ring. The body 14 is designed to allow the sensor 12 to sense a property of the fluid in the body, such as for example fluid pressure, temperature, or flow. As an example, the sensor 12 can be a pressure sensing device, such as a fluid actuated pressure transducer or a fluid actuated pressure switch, which can be used in the present invention to monitor or measure air pressure in an air line of a vehicle air brake system.

Figure 2:
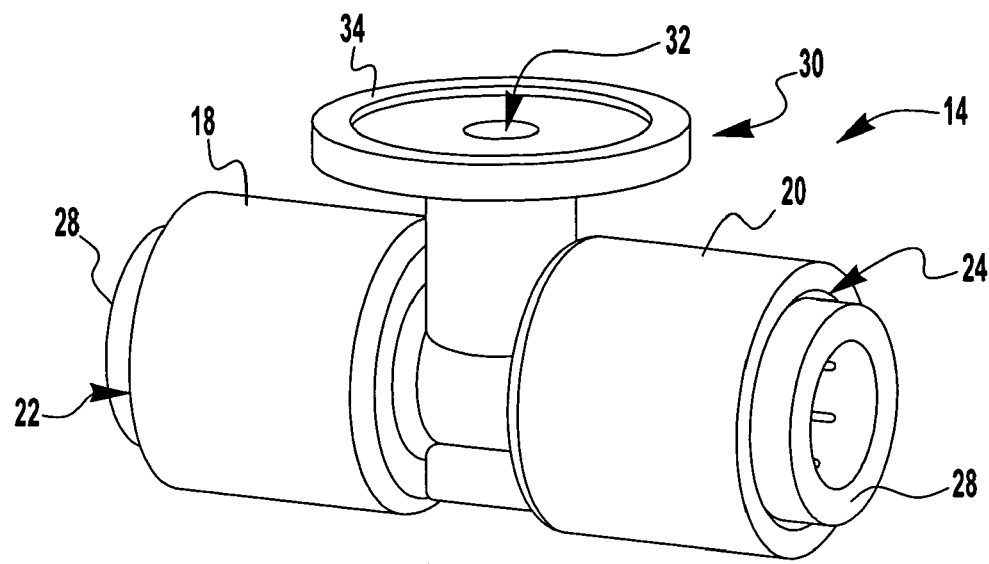
FIG. 2 illustrates a perspective view of the body of the exemplary sensor assembly of FIG. 1.
Figure 3:
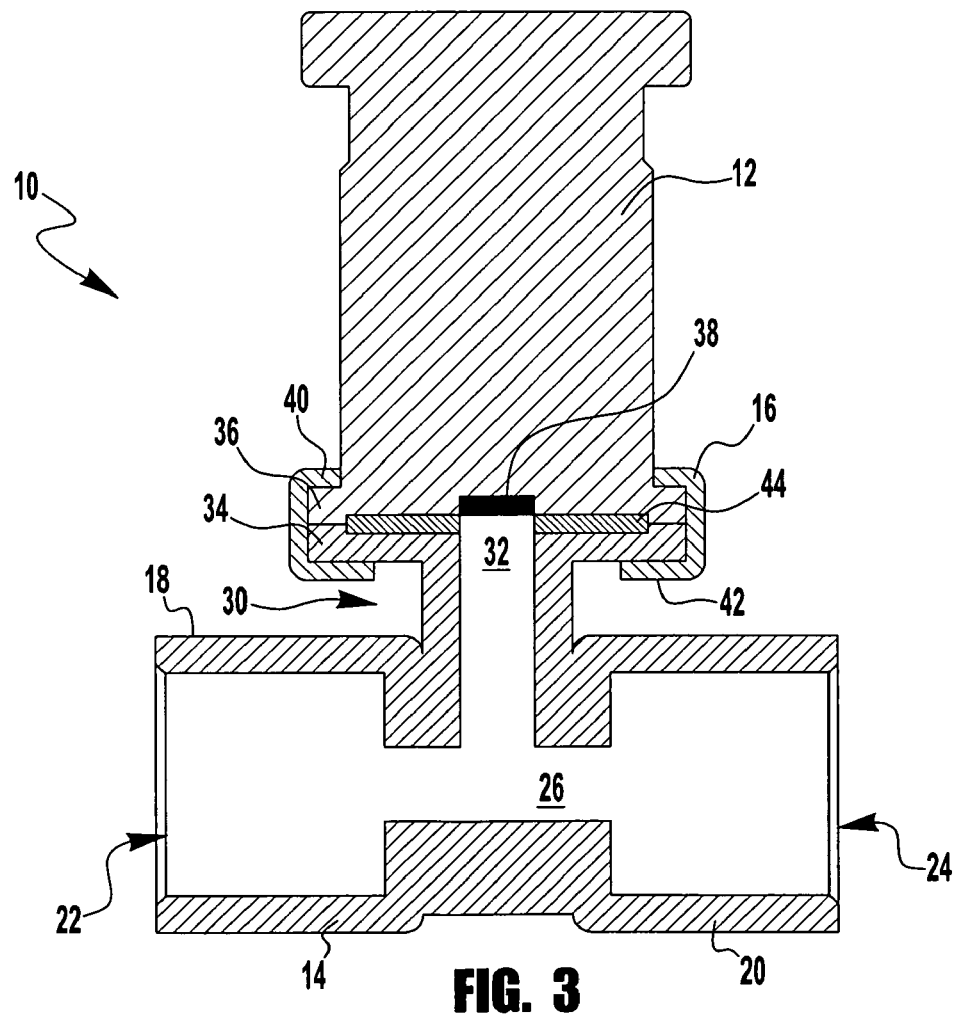
FIG. 3 illustrates a side cross-section of the exemplary sensor assembly of FIG. 1.

As shown in FIGS. 1-3, the body 14 of the first embodiment of the exemplary sensor assembly 10 is illustrated as a perpendicular tee fitting. The body 14, however, can be formed in a wide variety of configurations other than a perpendicular tee. For example, the body 14 can be a parallel tee, a union, a stem tee, a male branch, or other configuration suitable for placement in a fluid line.

The body 14 includes a first end portion 18 and a second end portion 20. The first end portion 18 can be an inlet portion having an inlet port 22 (FIG. 3) and the second end portion 20 can be an outlet portion having an outlet port 24. The inlet and outlet ports 22, 24 are connected by an internal passage 26 (FIG. 3) that allows fluid into the body 14. The first end portion 18 and the second end portion 20 are adapted to permit fluid lines (not shown) to connect to the body 14. Fluid lines may connect with the end portions 18, 20 in a variety of ways, such as for example quick connect fittings. For example, FIG. 2 illustrates push-to-connect fittings 28 inserted in the inlet port 22 and outlet port 24. Push-to connect fittings 28 when pressed into the ports 22, 24 are retained therein by a press or interference fit (i.e. the fittings 28 fit snugly within the ports 22, 24). Alternatively, the push-to connect fittings 28 may be retained within the ports 22, 24 in other ways, such as for example an o-ring, a retaining ring, adhesives, or other suitable ways, as is known in the art.

When attached to the body 14 via a push-to-connect fitting 28, the fluid line is in fluid communication with the body. The operation and design of push-to-connect fittings 28, such as for example, Bendix Commercial Vehicle System part number 5001668, is known in the art. The fluid lines, however, can connect to the body 14 in a variety of ways, some of which are described in relation to alternative embodiment below, others which will become apparent to those skilled in the art after considering the detailed description and appended claims in conjunction with the accompanying drawings. For example, the inlet port 22 and/or outlet port 24 can have threads that mate with a corresponding threaded fitting on the fluid line. Thus, the fluid line and the body 14 attach via a threaded connection. This can be accomplished, for example, by casting or machining the threads into the inlet port 22 and/or outlet port 24 of the body 14.

The body 14 also includes a sensor portion 30, which in the present embodiment is formed as a generally cylindrical structure extending perpendicular from the first end portion 18 and second end portion 20. The sensor portion 30 includes a sensor port 32 that is in fluid communication with the passage 26 (FIG. 3). The sensor portion 30 also includes a sensor interface portion 34 adapted to engage the fluid sensor 12. In FIGS. 2 and 3, the sensor interface portion 34 is a body flange adapted to mate with a similarly configured sensor flange 36 on the fluid sensor 12, shown schematically in FIG. 3. When the sensor flange 36 and body flange 34 mate, a sensing element 38 on the sensor 12 communicates with the fluid in the body 14 via the sensor port 32. The sensor 12 and body 14 are fixably attached in this position, resulting in a single, integrated part 10.

To fixably attach the sensor 12 and body 14, an attaching portion 16, such as for example an attaching ring, is used. The attaching ring 16 (FIGS. 1 and 3) is a generally cylindrical tube having a first end portion 40 and a second end portion 42. The attaching ring 16 fits over the junction between the sensor flange 36 and the body flange 34. The first end portion 40 and second end portion 42 are deformed or bent inward around the sensor flange 36 and the body flange 34, respectively. The ring 16 can be deformed or bent by crimping, metal spinning, or other suitable ways. Bending or deforming the end portions 40, 42 around the flanges 36, 34, holds the flanges together and prevents the sensor 12 and body 14 from separating. As a result, the sensor 12 and body 14 form a single integrated part 10. A seal element 44 (FIG. 3) can be provided between the flanges 34, 36 to prevent fluid leaks at the junction.

The sensor 12, and body 14, however, can attach in other ways, some of which are described in relation to alternative embodiments below, others which will become apparent to those skilled in the art after considering the detailed description and appended claims in conjunction with the accompanying drawings. Examples of suitable attaching portions include a ring or clamp deformed or crimped on both ends; a ring or clamp integral to the body and deformed or crimped on one end; sonic welding or spin welding; a metal ring or clamp with hydroforming, turning, swaging or spinning; mechanical means such as barbs, tabs, buttons, or detents, threads including metric or NPT; and glue, adhesives, resin or the sealant materials.

The body 14 can be made from a wide variety of materials. Examples of acceptable materials include brass, aluminum, steel, stainless steel, plastic, cast material, and sintered material. Likewise, the body 14 can be formed by a variety of methods. Examples of suitable methods include plastic injection molding, hydroforming, plastic or metal machining, metal casting or forging, and material extrusion. In addition, the attaching ring 16 can be made from a variety of material that can suitably bend to fixably attach the sensor 12 to the body 14. For example, aluminum has been found to be a suitable material for the attaching ring 16.

Once the sensor 12 is attached to the body 14 to form the single, integrated part 10, the assembly can easily be positioned in-line by plugging fluid lines into the fittings in the inlet and outlet ports 22, 24. The signal from the sensor can be outputted in a variety of ways known in the art. For example, the sensor can be electrically connected to a display or control device (not shown), as is known in the art. In the present embodiment, the sensor 12 is exposed from the body 14 allowing easy access to make the electrical connection to the sensor. Thus, the present invention provides a quick, economical, and easy way to sense a property of a fluid in-line while providing minimal leak points for the fluid.

Figure 4:
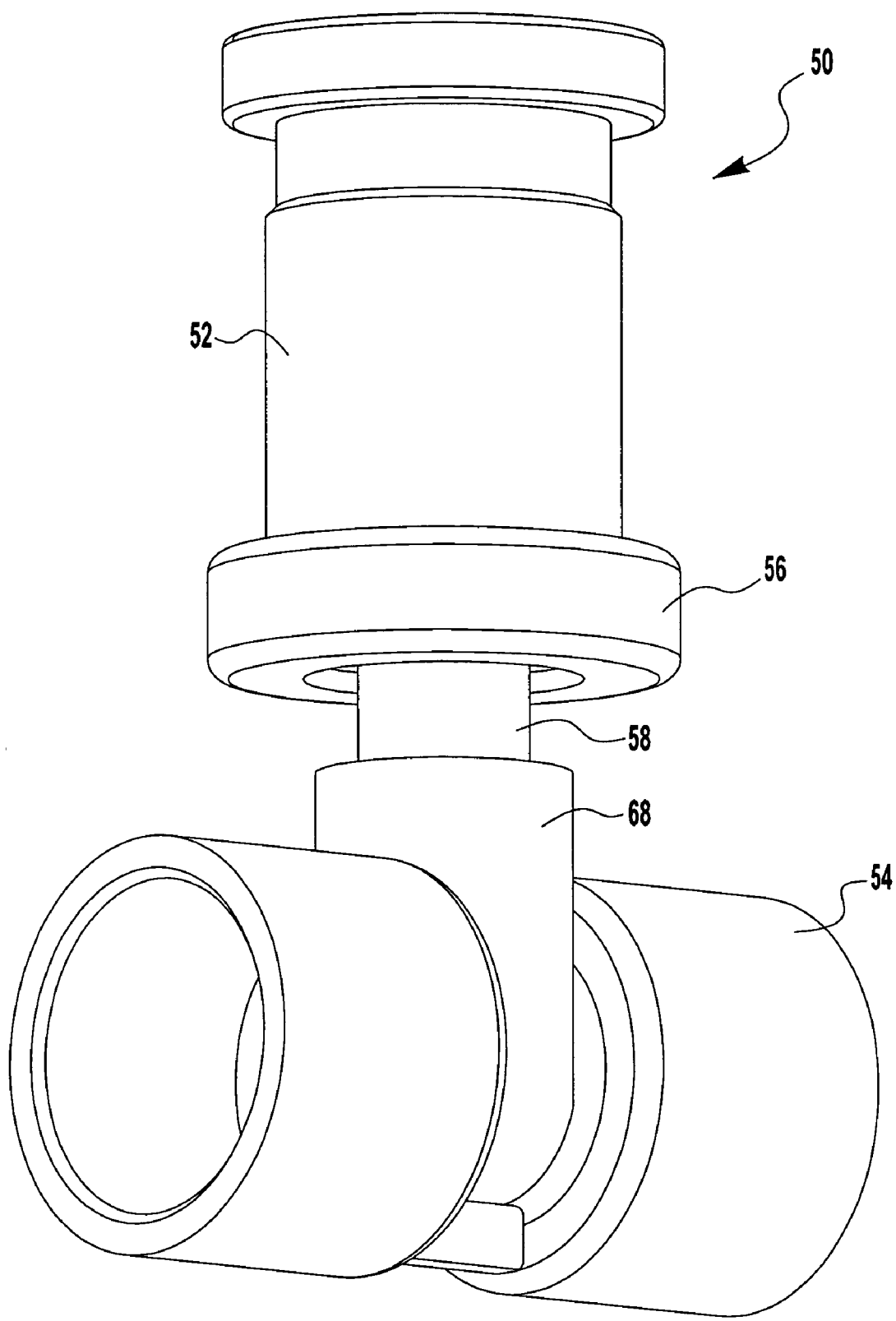
FIG. 4 illustrates a perspective view of a second embodiment of the exemplary sensor assembly according to the present invention.

FIGS. 4 and 5 illustrate another embodiment of the exemplary sensor assembly according to the present invention. In this embodiment, the sensor assembly 50 has the same basic design and features as were described above for the sensor assembly 10 of FIGS. 1-3. Specifically, the sensor assembly 50 includes a fluid sensor 52 mounted to a body 54 via an attaching portion 56. In the previous embodiment of FIGS. 1-3, the body 14 includes an integral sensor portion 30 with a sensor interface portion 34. In this embodiment, however, the assembly includes an adapter 58 with a sensor interface portion 60. Thus, the body 54 engages the adapter 58 and the attaching portion 56 attaches the sensor 52 to the adapter.

Referring to FIG. 5, the adapter 58 is a generally tube-like structure having a first end portion 62 and a second end portion 64 connected by a through bore 66. The through bore 66 is designed to fluidly connect the sensor 52 to the body 54. The first end portion 62 includes the sensor interface portion 60 realized as a flange substantially similar to the body flange 34 of the embodiment of FIGS. 1-3. The adapter 58 and the sensor 52 may attach in substantially the same way as the sensor 12 and body 14 attach in the embodiment of FIGS. 1-3, such as an attaching ring 56.

The body 54 includes an adapter portion 68 having an adapter port 70 that allows communication between the body 54 and the adapter 58. The adapter portion 68 includes a counter bore 72 for receiving the second end portion 64. The adapter 58 and the body 54 attach in a variety of ways. Suitable ways of attachment include, but are not limited to, sizing the adapter second end portion 64 to fit snugly within the counterbore 72 resulting in a press or interference fit; providing an adhesive between the second end portion 64 and the counterbore 72; and providing female threads on the counterbore 72 that mate with corresponding male threads on the second end portion 64.

FIG. 6 illustrates another embodiment of a body 80 of the exemplary sensor assembly according to the present invention. In this embodiment, the body 80 has the same basic design and features as were described above for the body 14 of FIGS. 1-3. Namely, the body 80 includes a sensor portion 82 having a sensor port 84 and sensor interface portion 86. In this embodiment, however, the body 80 has a single end portion 88 that attaches to a fluid line, as compared to a tee that has multiple end portions. As with the body 14 of FIGS. 1-3, the port 84 allows fluid communication between the fluid line and a sensor mounted to the sensor interface portion 86.

FIG. 7 illustrates another embodiment of the sensor portion 100 of the exemplary sensor assembly according to the present invention. In this embodiment, the sensor portion 100 has the same basic design and features as were described for the embodiments above. In particular, the sensor portion 100 includes a sensor port 102 and a sensor interface portion 104 realized as a flange. In this embodiment, however, an attaching ring 106 is molded into the flange 104. In particular, the attaching ring 106 includes an end portion 108 that is molded or cast into the flange 104 during the manufacture of the sensor portion 100. Thus, during assembly, this portion of the attaching ring 106 is already secured to the flange 104 and does not need to be deformed or bent as compared to the attaching ring 16 in embodiment of FIGS. 1-3.

Figure 8:
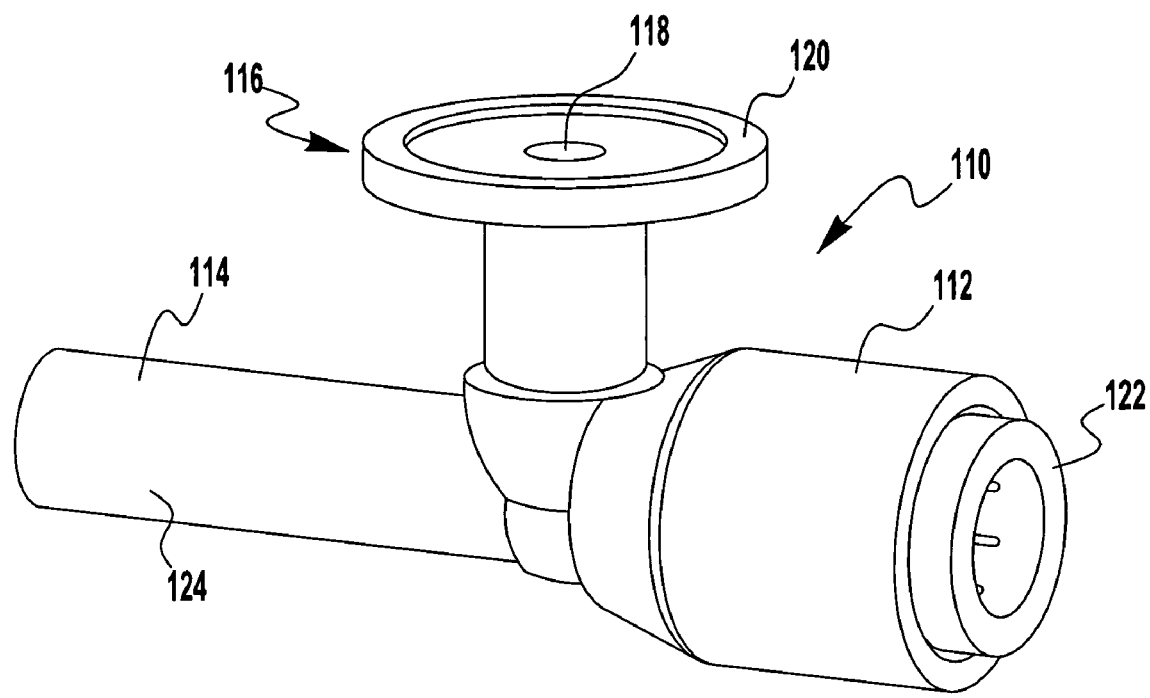
FIG. 8 illustrates a perspective view of a body of a fifth embodiment of the exemplary sensor assembly according to the present invention.

FIG. 8 illustrates another embodiment of a body 110 of the exemplary sensor assembly according to the present invention. In this embodiment, the body 110 has the same basic design and features as were described above for the body 14 of FIGS. 1-3. In particular, the body 110 includes a first end portion 112, a second end portion 114, and a sensor portion 116 having a sensor port 118 and sensor interface portion 120. The first end portion 112 can include a push-to-connect fitting 122 to connect the body 110 to a fluid line. In this embodiment, however, the second end portion 114 is formed as a stem 124. The stem 124 is received into a port, such as for example, a female adapter, on the fluid line. The adapter can be a push-to-connect fitting or the stem 124 can include male threads to mate with corresponding female threads on the adapter. One of ordinary skill in the art will appreciate that the body 110 can include multiple end portions formed as stems.

While the present invention has been illustrated by the description of embodiments thereof, and while the embodiments have been described in considerate detail, it is not the intention of the applicants to restrict or in any way limit the scope of the appended claims to such detail. Additional advantages and modification will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A fluid sensor assembly comprising:
    a body including a first port adapted to connect to a fluid line and an internal passage connecting the first port to a second port;
    a sensor interface portion attached to the body;
    a fluid sensor adapted to interface with the sensor interface portion, the fluid sensor including a sensing element in communication with the internal passage via the second port;
    an attaching portion for fixably attaching the fluid sensor to the sensor interface portion to form a single, integrated part; and
    a third port adapted to connect to a fluid line, the third port being in communication with the first and second ports.

2. The fluid sensor assembly according to claim 1 wherein the attaching portion is an attaching ring.

3. The fluid sensor assembly according to claim 1 wherein the attaching portion is an adhesive.

4. The fluid sensor assembly according to claim 1 wherein the sensor interface portion includes a first flange and the fluid sensor includes a second flange adapted to mate with the first flange.

5. The fluid sensor assembly according to claim 1 wherein the sensor interface portion is integral to the body.

6. The fluid sensor assembly according to claim 1 further comprising an adapter attached to the body, the adapter including the sensor interface portion and a through bore, wherein the sensor communicates with the internal passage via the through bore.

7. The fluid sensor assembly according to claim 6 wherein the adapter attaches to the body via a counterbore.

8. The fluid sensor assembly according to claim 1 wherein the fluid sensor is a pressure sensing device.

9. The fluid sensor assembly according to claim 1 wherein the fluid line is a pressurized air line.

10. The fluid sensor assembly according to claim 1 wherein the first port includes a push-to-connect fitting for facilitating the fluid line connecting with the first port.

11. A fluid sensor assembly comprising:
    a body including a first port adapted to connect to a fluid line and an internal passage connecting the first port to a second port;
    a sensor interface portion attached to the body;
    a fluid sensor adapted to interface with the sensor interface portion, the fluid sensor including a sensing element in communication with the internal passage via the second port; and
    an attaching portion for fixably attaching the fluid sensor to the sensor interface portion to form a single, integrated part,
    wherein the body is formed by plastic injection molding.

12. The fluid sensor assembly according to claim 11 wherein the attaching portion is an attaching ring.

13. The fluid sensor assembly according to claim 11 wherein the attaching portion is an adhesive.

14. The fluid sensor assembly according to claim 11 wherein the sensor interface portion includes a first flange and the fluid sensor includes a second flange adapted to mate with the first flange.

15. The fluid sensor assembly according to claim 11 wherein the sensor interface portion is integral to the body.

16. The fluid sensor assembly according to claim 11 further comprising an adapter attached to the body, the adapter including the sensor interface portion and a through bore, wherein the sensor communicates with the internal passage via the through bore.

17. The fluid sensor assembly according to claim 16 wherein the adapter attaches to the body via a counterbore.

18. The fluid sensor assembly according to claim 11 wherein the fluid sensor is a pressure sensing device.

19. The fluid sensor assembly according to claim 11 wherein the fluid line is a pressurized air line.

20. The fluid sensor assembly according to claim 11 wherein the attaching portion is plastically deformed to engage the fluid sensor and the sensor interface portion to fixably attach the sensor to the body.

21. A sensor assembly for measuring in-line air pressure, the assembly comprising:
    a body having a first port and a second port, the first port adapted to connect to a pressurized air line and the second port connected to the first port by an internal passage;
    a pressure sensor fixably attached to the body by an attaching portion, the pressure sensor being in communication with the internal passage via the second port; and
    an adapter attached to the body, the adapter including a flange and a through bore, wherein the sensor attaches to the flange and communicates with the internal passage via the through bore.

22. The sensor assembly according to claim 21 wherein the first port includes a push-to-connect fitting for facilitating the air line connecting with the first port.

23. The sensor assembly according to claim 21 wherein the sensor and body form a single, integrated part.

24. The sensor assembly according to claim 21 wherein the attaching portion is an attaching ring.

25. The sensor assembly according to claim 21 wherein the body is formed as a tee fitting.

26. A fluid sensor assembly comprising:
   a body having a first port and a second port, the first port adapted to connect to a pressurized air line and the second port connected to the first port by an internal passage;
   a sensor interface portion attached to the body;
   a fluid sensor adapted to interface with the sensor interface portion, the fluid sensor including a sensing element in communication with the internal passage via the second port; and
   an attaching portion having a first end portion that is deformed to hold the fluid sensor and body together as a single, integrated part and a second end portion molded into the sensor interface portion.

27. A fluid sensor assembly comprising:
   a body having a first port and a second port, the first port adapted to connect to a pressurized air line and the second port connected to the first port by an internal passage;
   a sensor interface portion attached to the body;
   a fluid sensor adapted to interface with the sensor interface portion, the fluid sensor including a sensing element in communication with the internal passage via the second port; and
   an attaching portion having a first end portion that is deformed to hold the fluid sensor and body together as a single, integrated part and a second end portion, wherein the first end portion is deformed to engage the sensor and the second end portion is deformed to engage the sensor interface portion.

28. The fluid sensor assembly according to claim 27 wherein the body includes a third port adapted to connect to a fluid line, the third port being in communication with the first and second ports.

29. The fluid sensor assembly according to claim 27 wherein the body includes a plurality of ports adapted to connect to a fluid line.

30. The fluid sensor assembly according to claim 27 wherein the fluid sensor is a pressure sensing device.

\* \* \* \* \*